United States Patent [19]

Ryan

[11] Patent Number: 4,508,739
[45] Date of Patent: Apr. 2, 1985

[54] POTATO PRODUCT WITH OPPOSITE CORRUGATIONS OF DIFFERENT FREQUENCIES

[75] Inventor: Philip J. Ryan, Dallas, Tex.

[73] Assignee: Frito-Lay, Inc., Dallas, Tex.

[21] Appl. No.: 447,643

[22] Filed: Dec. 7, 1982

[51] Int. Cl.³ .................... A23L 1/212; A23L 1/216; A23P 1/00
[52] U.S. Cl. .................... 426/144; 426/550; 426/637; 426/808
[58] Field of Search ............... 426/104, 144, 549, 550, 426/615, 441, 637, 438, 512, 516, 517, 518, 808, 641

[56] References Cited

U.S. PATENT DOCUMENTS

| | | |
|---|---|---|
| 678,514 | 7/1901 | Regnier . |
| 1,965,500 | 7/1934 | Knott . |
| 1,965,501 | 7/1934 | Knott . |
| 2,132,690 | 10/1938 | Hilliard .................... 426/144 |
| 2,567,248 | 9/1951 | Stahmer . |
| 2,612,453 | 9/1952 | Stahmer . |
| 2,681,674 | 6/1954 | Stahmer . |
| 2,686,720 | 8/1954 | La Rosa .................... 426/144 |
| 2,767,752 | 11/1956 | Stahmer . |
| 2,769,714 | 11/1956 | Stahmer . |
| 2,769,715 | 11/1956 | Stahmer . |
| 3,358,379 | 12/1967 | Coley .................... 426/144 X |
| 3,391,005 | 7/1968 | Babigan .................... 426/144 X |
| 3,956,517 | 5/1976 | Curry et al. .................... 426/808 X |
| 4,166,136 | 8/1979 | Stoll .................... 426/144 |
| 4,219,575 | 8/1980 | Saunders .................... 426/438 X |
| 4,235,941 | 11/1980 | Coats .................... 426/144 X |
| 4,337,275 | 6/1982 | Adams .................... 426/144 X |

FOREIGN PATENT DOCUMENTS

| | | | |
|---|---|---|---|
| 701899 | 1/1965 | Canada | 426/144 |
| 898057 | 4/1972 | Canada | 426/144 |

Primary Examiner—Arthur L. Corbin
Attorney, Agent, or Firm—Bernard, Rothwell & Brown

[57] ABSTRACT

Food product pieces are formed with corrugations on opposite sides thereof wherein the corrugations formed on one side have a frequency in the range from 1.5 to 5 times the frequency of the corrugations formed on the other side. As a result, flavor and texture development can be controlled during later cooking processes.

7 Claims, 6 Drawing Figures

U.S. Patent   Apr. 2, 1985   4,508,739
FIG. 1
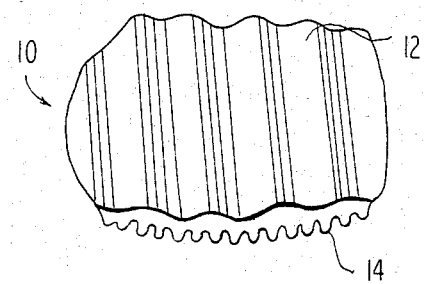
FIG. 2
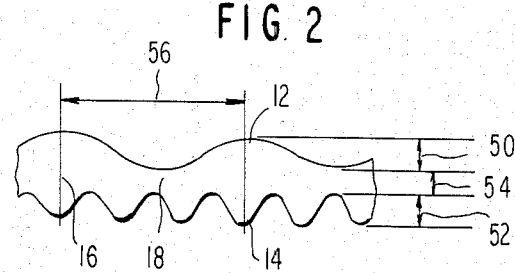
FIG. 3
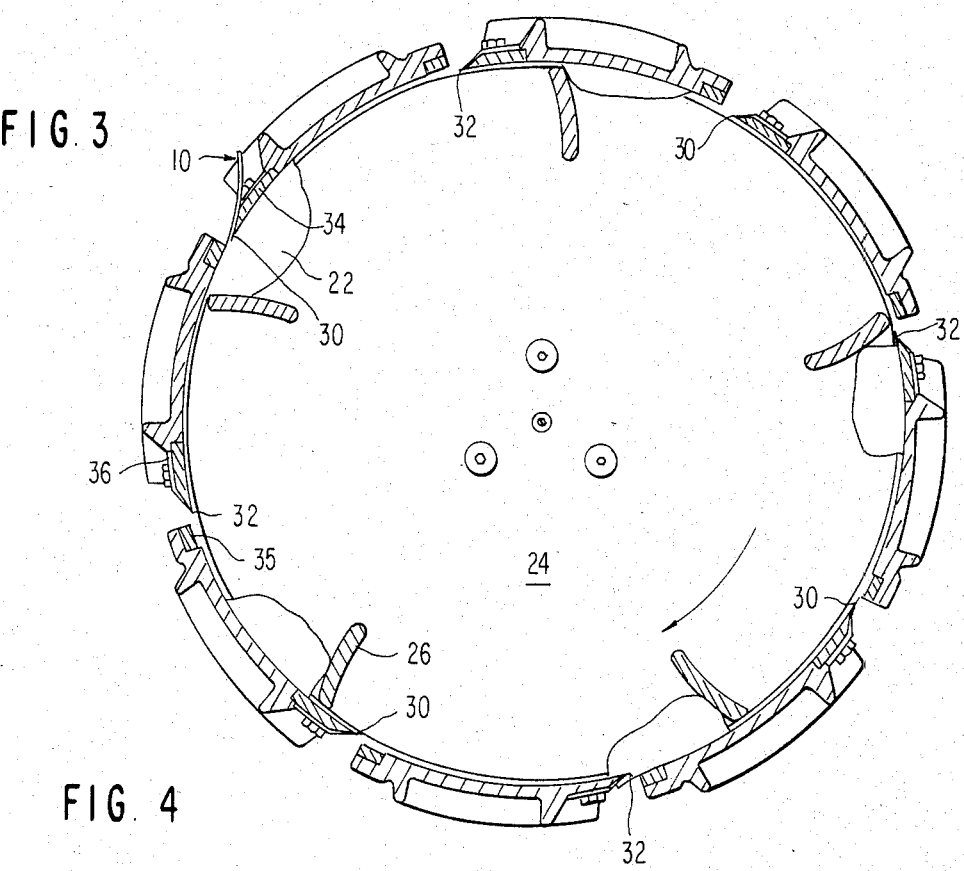
FIG. 4
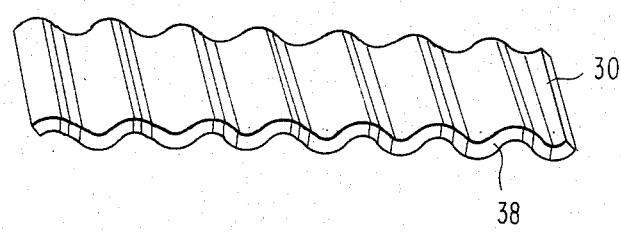
FIG. 5
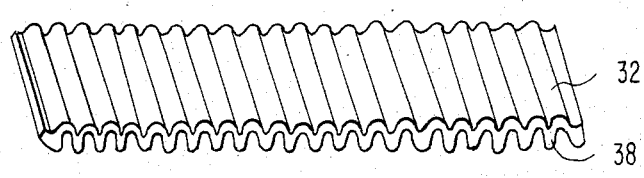
FIG. 6

POTATO PRODUCT WITH OPPOSITE CORRUGATIONS OF DIFFERENT FREQUENCIES

BACKGROUND

1. Field of the Invention

The present invention relates to sliced food products which are subsequently cooked or fried and methods and apparatus of manufacturing such sliced products.

2. Description of the Prior Art

Potato chips such as described in U.S. Pat. No. 2,769,715 and having a wavy or corrugated configuration, are commercially manufactured and sold. The corrugated potato product which has met with substantial commercial success has parallel corrugations on the opposite surfaces thereof which are "in-phase", i.e. the ridges on one side directly overlie valleys on the opposite side so that the thickness of the chip is substantially uniform throughout the entire chip. The above patent U.S. Pat. No. 2,769,715 also discloses a sliced corrugated potato product wherein the corrugations on opposite sides are "out-of-phase", i.e. the ridges on one side directly overlie the ridges on the other side, and a sliced corrugated potato product wherein the corrugations on one side are crisscrossed relative to the corrugations on the opposite side. Such out of phase and crisscross corrugated potato products have periodically varying thicknesses throughout which when subjected to a cooking process, such as frying, cook at different rates producing unique texture and flavor different from products of uniform thickness. The out-of-phase corrugated product has substantial weaknesses at the mating opposing valleys of the product which results in undue breaking and fragmentation of the product during manufacture, packaging and handling. The crisscross corrugated product has substantially greater strength; however, existing processes and apparatus for manufacturing such crisscross corrugated product have one or more deficiencies such as producing substantially less through-put, requiring excessive maintenance, being substantially more costly, having higher scrap losses and restricted to only a small range of potato size, when compared to non-corrugated and in-phase corrugated potato products. Thus commercial success of the out-of-phase and crisscross corrugated potato product has been limited.

SUMMARY OF THE INVENTION

The present invention is summarized in the formation of corrugations on opposite surfaces of a food piece wherein the corrugations on one surface have a frequency in the range from 1.5 to 5 times the frequency of the corrugations on the other surface. The food piece may be formed by cuts made by cutting slices from the body using alternate blades with flutes of the different frequencies or by other means such as extrusion, sheeting, etc.

An object of the invention is to produce an economical food piece having periodic varying thicknesses producing unique flavor and texture during cooking.

Another object of the invention is to produce inexpensive and reliable techniques and apparatus for producing sliced food products with periodically varying thickness.

One advantage of the present invention is that presently proven reliable apparatus and techniques for producing food slices can be modified to form the invention without substantial reduction in reliability or increase in cost.

One feature of the invention is that the flavors and textures produced can be altered by selecting the periods and amplitudes of the flutes of the alternating cutting blades.

Other objects, advantages and features of the invention will be apparent from the following description of the preferred embodiment taken in conjunction with the accompanying drawings.

BRIEF DESCRIPTION OF THE DRAWINGS

FIG. 1 is a perspective view of a potato slice formed in accordance with the invention.

FIG. 2 is a cross section of a broken away portion of the potato slice of FIG. 1.

FIG. 3 is a horizontal section view of an apparatus for manufacturing potato slices in accordance with the invention.

FIG. 4 is a perspective view of a first cutting blade removed from the apparatus of FIG. 3.

FIG. 5 is a perspective view of a second cutting blade removed from the apparatus of FIG. 3.

FIG. 6 is a view similar to FIG. 2 of a variation of the potato slice formed in accordance with the invention.

DESCRIPTION OF THE PREFERRED EMBODIMENT

As illustrated in FIGS. 1 and 2, a food piece, such as a potato slice indicated generally at 10, manufactured in accordance with one embodiment of the invention includes wide corrugations 12 on the upper side thereof and narrow corrugations 14 on the lower side. The corrugations 12 and 14 are parallel to each other with the corrugations 14 having a substantially greater frequency than the corrugations 12 to thus produce periodic regions or elongated areas 16 of substantially greater thickness interspersed with regions or elongated areas 18 of lesser thickness. The sliced potato products 10, when cooked or fried in a conventional fryer, cook differentially in different thickness portions thereof and have a texture and flavor substantially similar to the prior art crisscross corrugated potato products.

In manufacture of the potato slices 10, washed whole potatoes 22, which may be peeled or unpeeled, are fed onto the horizontal base 24 of a rotating impeller in a potato slicer shown in FIG. 3. The impeller includes vertical vanes 26 which direct the potatoes 22 radially outward and against an interior cylindrical vertical surface formed by eight spaced slicing castings 28 supported in a circular configuration. First and second types of cutting blades 30 and 32 are mounted by knife holders 34 and knife clamps 36 on leading vertical edges of corresponding alternate castings 28. Gate inserts 35 spaced from the cutting blades define therewith vertical slots through which the slices 10 are discharged as they are being cut. As shown in FIGS. 4 and 5, the cutting blades 30 and 32 are fluted such that the frequency or pitch of the flutes of the cutting blade 32 is substantially greater than the frequency or pitch of the flutes of the cutting blade 30. The holders 34 and clamps 36 have corresponding grooves and ridges (not shown) for supporting the blades 30 and 32 with the sharpened cutting edges 38 of the blades 30 and 32 extending a selected distance into the interior of the slicing bowl for cutting slices from the potatoes 22 as the potatoes are moved by the impeller vanes 26 along the interior cylindrical surface. Conveniently the potato slicer is a conventional potato slicer, such as model CC manufactured by Urschel Laboratories, Inc. of Valparaiso, Indiana, in which the cutting blades and the corresponding clamps and knife holders have been replaced with the cutting blades 30 and 32 and the knife holders 34 and knife clamps 36; such blades 30 and 32, knife holders 34 and knife clamps 36 having the same general configuration as the original blades, holders and clamps, but with differing flute frequencies. The potato slices 10 are then subjected to conventional processing including the frying in a deep fat fryer to form the potato chips.

Preferably the corrugations 12 formed in the potato slices, prior to cooking, have an amplitude or a peak to valley dimension as illustrated by the arrowed line 50 in FIG. 2 within the range from about 0.03 to 0.20 inches (0.7 to 5.1 mm) and especially preferred to be about 0.090 inch (2.3 mm). The corregations 14 preferably have an amplitude or a peak to valley dimension 52 within the range from about 0.03 to 0.20 inches (0.7 to 5.1 mm) and especially preferred to be about 0.06 inches (1.5 mm). The thickness spacing between planes defined by the deepest points of the valleys of the corrugations 12 and 14 as shown by the arrowed line 54 is preferably within the range from about 0.01 to 0.10 inches (0.2 to 2.5 mm) and especially preferred to be about 0.04 inches (1.0 mm). The pitch of the larger ridges 12 is preferably within the range from about 3 to 10 corrugations per inch (1 to 4 corrugations per cm) and especially preferred to be about 4 corrugations per inch (1.6 corrugations per cm); one corrugation 12 being considered as a full sinusoidal cycle as shown by the arrowed line 56. The pitch of the smaller ridges is preferably within the range from about 9 to 30 corrugations per inch (3 to 12 corrugations per cm) and especially preferred to be about 12 corrugations per inch (4.7 per cm). The ratio of the pitch of the corrugations 12 relative to the pitch of the corrugations 14 is preferably within the range from about 1.5 to 5. The number of corrugations 14 must be about 1.5 or greater times the number of corrugations 12 in order to produce the thickness variations and unique texture and flavor while ratios greater than about 5 are more difficult to form and do not produce any added benefit. The ratio of corrugations 14 to corrugations 12 of about 3 to 1 is especially preferred for producing unique texture and flavor and appearance. This ratio may be varied to produce desired different results.

The potato slices 10 having the large corrugations 12 on one surface and the smaller corrugations 14 on the opposite surface are readily formed in conventional slicing apparatus wherein only the fluting frequency of the cutting blades and the associated holders and clamps has been modified. This type of apparatus has demonstrated substantially greater reliability and higher throughput without requiring any prior sizing of the potatoes compared to prior art apparatus including mechanisms for rotating the potatoes during successive cuts to produce crisscross corrugated potato slices.

Additionally it is found that the web, i.e. the minimum thickness 54 between valleys, can be thicker without increasing the cooking time compared to out-of-phase and crisscross corrugated potato chips; the relatively high pitch of the small corrugations contributes to minimizing cooking time while permitting product variation.

Where the pitch of the corrugations 14 is substantially an exact multiple of the pitch of the corrugations 12, then selection of the relative phase between the upper and lower corrugations can be used to tailor the flavor and texture of the product. In the example illustrated in FIG. 2 where the pitch of the corrugations 14 is substantially three times the pitch of the corrugations 12, the portion of maximum height of each ridge 12 overlies a ridge 14, and the deepest portion of a valley between each ridge 12 overlies a valley between ridges 14 to produce a maximum variation between the regions 16 of greater thickness and the regions 18 of less thickness. Thus the slice of FIG. 2 produces a maximum contrast in cooking variation between regions 16 and 18 to produce a desired flavor and texture. In the slice of FIG. 6, the portion of maximum height of each ridge 12 overlies a valley between ridges 14, and each valley between ridges 12 overlies a ridge 18 to produce a lesser contrast between thicknesses and cooking times of the regions 16 and 18. The product resulting from the slice of FIG. 6 will have a greater strength against breakage due to the increased thickness in region 18.

While the above described embodiment is particularly described with respect to slices of raw potatoes, the present invention is also applicable to other sliced products including slices of other vegetables, such as carrots, slices of fruits, such as, bananas, or slices of other food materials such as doughs, meat, etc. Additionally the corrugations of different frequencies producing unique texture and flavor properties can be formed by techniques other than by slicing, for example by extruding or impressing doughs, meat patties, etc. Unique texture and flavor properties are imparted by differential cooking times in the periodically varying thicknesses of the food product piece.

In a method of forming a food product from a dough material, the dough material is formed into a ribbon or sheet which has corrugations on its upper and lower surfaces with the same differing frequencies and the same amplitudes and web thicknesses as with the above described slices. The dough is formed in a conventional matter from cereals, vegetables, and other materials. The corrugations are formed either by extruding the dough through a slot-like orifice having opposite fluted edges of the different frequencies or by impressing the corrugations on a dough sheet formed from the dough, such as by passing the dough through a pair of sheeter rolls having corrugations and being spaced to produce the corrugated sheet or ribbon. The corrugated sheet or ribbon can be cooked, such as by frying, prior to being divided into product pieces, or the corrugated sheet or ribbon can be first divided in pieces which are then cooked or fried.

Since many modifications, variations and changes in detail may be made to the described embodiment, it is intended that all matter in the foregoing description and shown in the accompanying drawings be interpreted as illustrative and not in a limiting sense.

What is claimed is:
1. A food product comprising:
 a potato slice or potato dough sheet having corrugations on opposite surfaces thereof,
 the corrugations on one surface having a frequency in the range from 1.5 to 5 times the frequency of the corrugations on the opposite surface, and
 said slice or sheet having the capability of being cooked differentially in different thickness portions thereof.
2. A food product as claimed in claim 1 wherein the corrugations on the opposite surfaces of the slice or sheet are parallel to each other.

3. A food product as claimed in claim 2 wherein the corrugations on the one surface have a frequency of about 3 times the frequency of the corrugations on the opposite surface.

4. A food product as claimed in claim 2 wherein the potato slice or potato dough sheet is fried.

5. A food product as claimed in claim 4 wherein the corrugations on the one surface have a frequency within the range from 3 to 12 corrugations per cm, and the corrugations on the opposite side have a frequency within the range from 1 to 4 corrugations per cm.

6. A food product as claimed in claim 5 wherein the amplitude of the corrugations on the one surface is within the range from 0.7 to 5.1 mm, and the amplitude of the corrugations on the opposite surface is within the range from 0.7 to 5.1 mm, and the slice or sheet has a minimum thickness between planes, defined by the deepest points of valleys of the opposite corrugations, within the range from 0.2 to 2.5 mm.

7. A food product as claimed in claim 4 wherein the potato slice or sheet, prior to frying, has corrugations on the one surface with an amplitude of about 1.5 mm, has corrugations on the opposite surface with an amplitude of about 2.3 mm, has a minimum thickness between valleys of opposite corrugations of about 1.0 mm, has a pitch on the one surface of about 4.7 corrugations per cm, and has a pitch on the opposite surface of about 1.6 corrugations per cm.

* * * * *